United States Patent [19]
Watanabe et al.

[11] Patent Number: 5,344,295
[45] Date of Patent: Sep. 6, 1994

[54] POSTCURE TIRE INFLATOR HAVING RIM CLEARANCE ADJUSTING DEVICE

[75] Inventors: Etsuro Watanabe; Katsumi Ichikawa; Yoshimata Maikuma, all of Kobe, Japan

[73] Assignee: Kabushiki Kaisha Kobe Seiko Sho, Kobe, Japan

[21] Appl. No.: 943,564

[22] Filed: Sep. 11, 1992

[30] Foreign Application Priority Data

Sep. 11, 1991 [JP] Japan .................................. 3-261198
Jan. 8, 1992 [JP] Japan .................................. 4-020533
Jun. 29, 1992 [JP] Japan .................................. 4-196247

[51] Int. Cl.$^5$ ............................................. B29C 35/16
[52] U.S. Cl. ..................................... 425/29; 425/34.1; 425/58.1
[58] Field of Search .................. 425/28.1, 29, 34.1, 425/38, 58.1

[56] References Cited

U.S. PATENT DOCUMENTS

| | | | |
|---|---|---|---|
| 3,621,520 | 11/1971 | Ulm | 425/58.1 |
| 4,092,090 | 5/1978 | Yuhas et al. | 425/58.1 |
| 4,124,337 | 11/1978 | Martin | 425/58.1 |
| 4,449,903 | 5/1984 | Hasegawa et al. | 425/38 |
| 4,702,669 | 10/1987 | Ichikawa et al. | 425/58.1 |
| 5,225,138 | 7/1993 | Irie | 425/58.1 |

FOREIGN PATENT DOCUMENTS

63-12971 4/1988 Japan .

Primary Examiner—James Mackey
Attorney, Agent, or Firm—Oblon, Spivak, McClelland, Maier & Neustadt

[57] ABSTRACT

A rim clearance adjusting device of a postcure tire inflator is capable of automatically adjusting a clearance between upper and lower rims, A vulcanized tire from a vulcanizer is filled with high-pressure air for inflating and cooling purposes. For these purposes there is installed a rotating screw member which holds the tire between the separable upper and lower rims, and moves the lower rim upwards and downwards between the lower rim and its support member. Also there is provided a sliding device for moving the lower rim, together with the support member thereof, between the lower position of the upper rim and the intermediate position on the vulcanizer side. And furthermore there is mounted a driving mechanism for driving the rotating screw member to the intermediate position.

9 Claims, 11 Drawing Sheets

POSTCURE TIRE INFLATOR HAVING RIM CLEARANCE ADJUSTING DEVICE

BACKGROUND OF THE INVENTION:

1. Field of the Invention.

The present invention relates to a postcure tire inflator for inflating and cooling a vulcanized tire and a tire feeding equipment thereof and, more particularly, to an equipment for automatically adjusting a clearance between upper and lower rims.

2. Description of the Prior Art

As a prior-art postcure inflator, a turnover type postcure inflator has been widely used. This type of inflator has two sets of upper and lower rims for holding a tire in relation to one cavity of a tire vulcanizer for the purpose of setting a vulcanized tire inflating and cooling time to one cycle per hour or more of tire vulcanizer operation, and two right and left symmetrical cavities like a vulcanizer having two cavities.

To perform the inflation and cooling of a tire, such as a radial tire in general use in these days, which requires high accuracy, there is demanded a tire feeding equipment which is able to center the vulcanized tire, that has come from the tire vulcanizer, in proper position on the lower rim of the postcure inflator. However, since, in the turnover type postcure inflator, the two sets of upper and lower rims rotate, there is a spatial limit to the mounting of a mechanism for centering the tire. To cope with this drawback, there have been proposed various carrying devices, for example, a carrying device (refer to Japanese Patent Publication No. Sho 63-12971) of such a design that a vulcanized tire from the tire vulcanizer is supported at the lower side, loaded on a belt conveyor located between the tire vulcanizer and the postcure tire inflator, and carried to a point above the lower rim, and then, after the centering of the tire in position, the lower rim is raised; a carrying device (refer to Laid-Open Japanese Patent Application No. Sho 60-182116) that the vulcanized tire taken out of the vulcanizer is supported at the lower side by an arm and carried to an intermediate position between the tire vulcanizer and the postcure tire inflator, where the tire is loaded on a feed arm of the postcure tire inflator and carried to a point above the lower rim, which is then moved up to the tire; and also a carrier equipment (refer to Laid-Open Japanese Patent Application No. Sho 59-14933) which has a chuck for holding the upper beam of the vulcanized tire, and carries the tire from the center of the vulcanizer to the lower rim at the center of the postcure tire inflator by means of a carrying arm which is vertically movable and swingable from the center of the tire vulcanizer to the intermediate position.

However, the carrying device using the belt carrying device and the feed arm not only becomes a complicated mechanism but can not properly center the tire in position as expected; and in the carrying device for carrying the tire to the lower rim at the center of the postcure tire inflator by the use of the swingable and vertically movable carrying arm, the carrying device goes in between the upper and lower rims, widening the clearance between the separable upper and lower rims. Because of the above-described construction, the equipment has become large in size. This equipment is provided with a sliding device which moves the lower rim between the lower position of the upper rim mounted on the postcure tire inflator and the intermediate position on the vulcanizer side, so that the vulcanized tire can be mounted directly on the lower rim without upper spatial limit. It is, therefore, possible to reliably center the vulcanized tire on the postcure inflator by the use of a feeding equipment of simple mechanism and also to easily replace the upper and lower rims when tire sizes are changed, by utilizing the intermediate position.

Either machine described above generally uses a spacer- or screw-type rim clearance adjusting device for adjusting a clearance between the upper and lower rims. The spacer-type rim clearance adjusting device requires much time to replace the tire, while the screw-type adjusting device is designed to turn a screw by a wrench. This screw-type rim clearance adjusting device, however, has such a problem that turning a screw by the wrench in a narrow space in the postcure tire inflator body to be turned over requires much time.

SUMMARY OF THE INVENTION

In view of the above-described various problems inherent to the heretofore known techniques, it is an object of the present invention to provide a rim clearance adjusting device in a postcure tire inflator which is a further improved version of the postcure tire inflator and its carrying device previously applied by the present applicant for a patent, for automatic adjustment of a clearance between the upper and lower rims by using the lower position of the upper rim mounted on the postcure inflator to an intermediate position on the vulcanizer side.

In an attempt to accomplish the above object, the rim clearance adjusting device of the postcure tire inflator of the present invention is provided with two cavities having a rotating screw member for holding the vulcanized tire between the separable upper and lower rims and vertically moving the lower rim between the lower rim and its support member, for inflating and cooling the tire by sealing the high-pressure air in the tire which has come from the vulcanizer having two cavities. In this rim clearance adjusting device is further provided a sliding device for moving the lower rim together with its support member between the lower position of the upper rim and the intermediate position on the vulcanizer size. And further a driving mechanism is mounted in the intermediate position for driving the rotating screw member. For the two cavities may be provided with one driving mechanism which is movable along a connecting member connecting two intermediate positions. Furthermore, for adjustment of rim height above the support member, there may be used a height detecting means and a control circuit which outputs a driving signal for driving the driving mechanism which rotates the rotating screw member in accordance with a comparison of a height signal with a preset height value.

The height of the lower rim can be automatically adjusted by rotating the screw member by means of the driving mechanism installed thereat, with the lower rim moved to and set in the intermediate position by the sliding device.

The present invention and its features and advantages will be set forth and become more apparent in the detailed description of the preferred embodiment presented below.

DESCRIPTION OF THE PREFERRED EMBODIMENT

Hereinafter an exemplary embodiment of a rim clearance adjusting device of a postcure tire inflator according to the present invention will be described with reference to the accompanying drawings. First, the constitution of a postcure tire inflator and a carrying device to which the rim clearance adjusting device of the postcure tire inflator of the present invention is applied, will be explained by referring to FIG. 5. Next, the rim clearance adjusting device of the postcure tire inflator of the present invention will be explained by referring to FIGS. 1 and 2.

Figure 5:
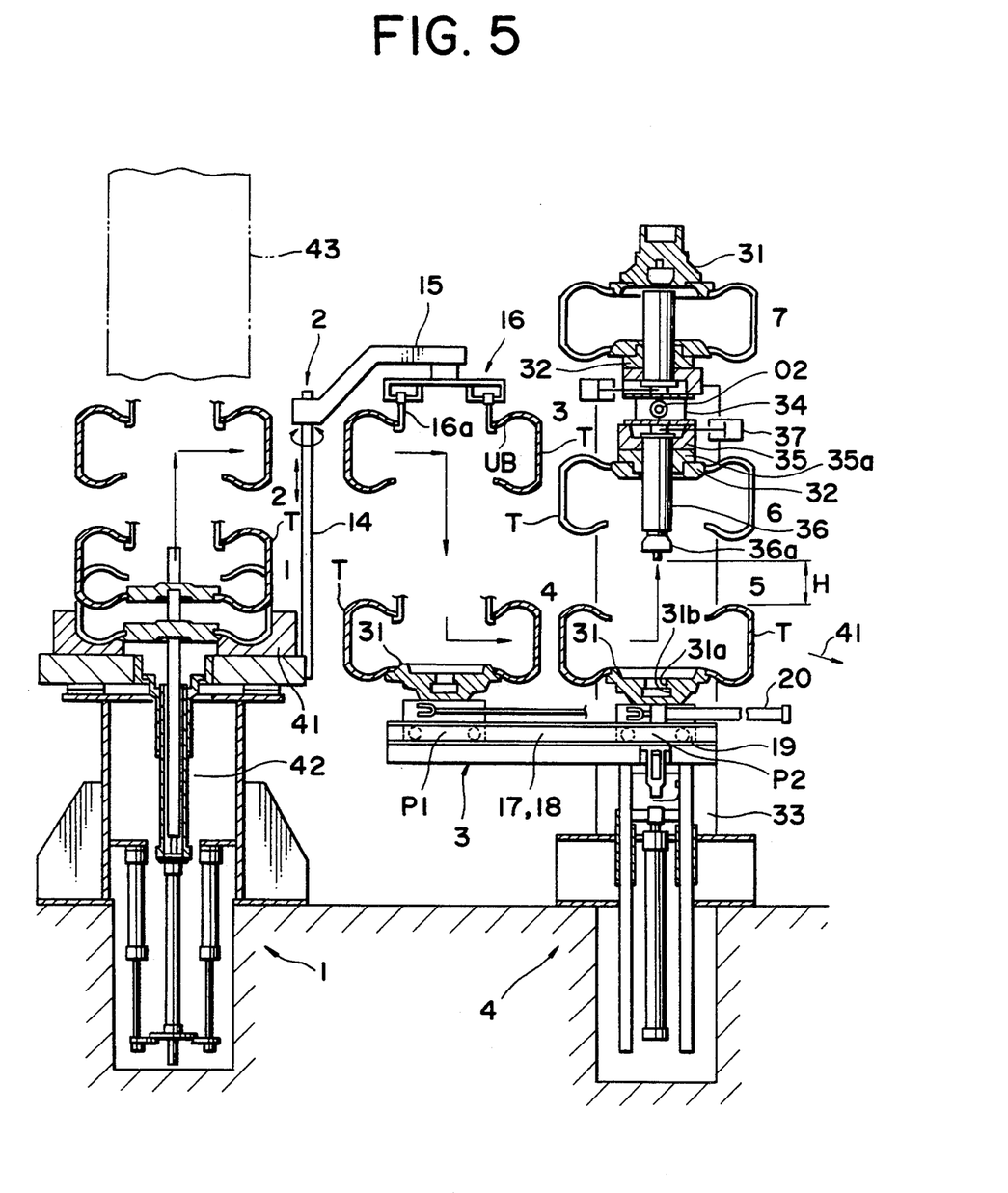
FIG. 5 is a side view of the postcure tire inflator and its carrying device of the present invention.

FIG. 5 is a side view showing the postcure tire inflator and one cavity in the carrying device thereof, in which a numeral 1 refers to a tire vulcanizer; 2, a carrying device; 3, a sliding device; and 4, a postcure tire inflator.

The tire vulcanizer 1 is designed to be opened and closed by a lifting device not illustrated, and has an upper and lower molds 41 in which a tire will be clamped by a clamping cylinder which is not illustrated. At the center of the upper and lower molds is provided for example a standing post-type centering mechanism 42. In the illustrated example, the upper and lower molds are open with a vulcanized tire T separated to the position ① from the lower mold 41 by the centering mechanism 42.

Figure 1:
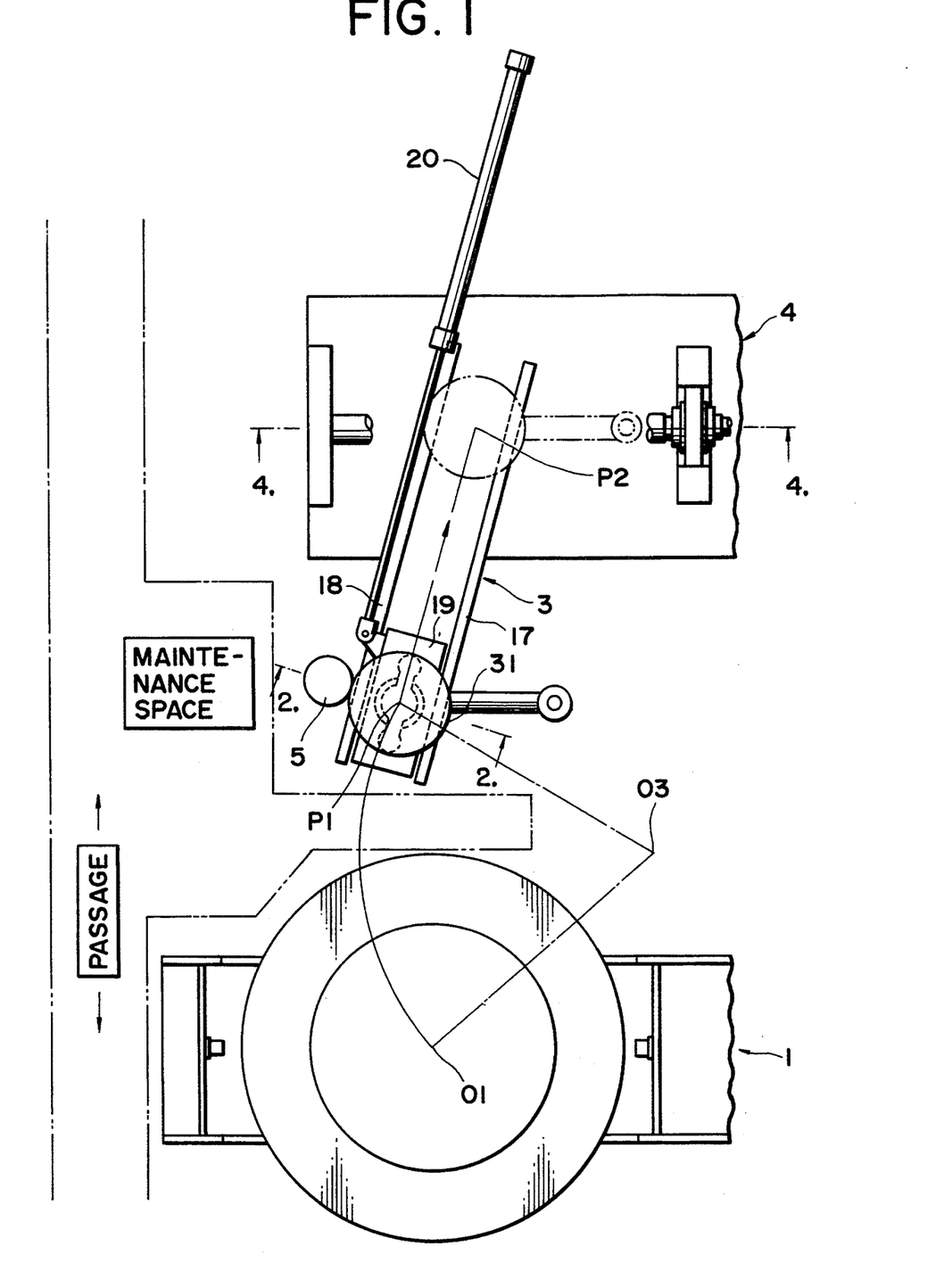
FIG. 1 is a top view of a rim clearance adjusting device of a postcure tire inflator of the present invention.

The carrying device 2 is mounted in a proper place on a frame 43 of the tire vulcanizer 1, comprising a vertical column 14, a carrying device arm 15 which can be moved up and down and swung by means of a plurality of cylinder devices not illustrated, in relation to the column 14, and a chuck 16 installed on the forward end of the carrying device arm. The chuck 16 has three or more pawls 16a circumferentially arranged at an equal spacing. These pawls 16 are designed to be simultaneously opened in a radial direction and closed by the cylinder device not illustrated. When the pawls 16a in a closed state are fed into the tire T and opened, the tire T is held by an upper bead UB. When, in a specific position, the pawls 16a are closed, the tire T is released. As shown in FIG. 1, this chuck has a center of rotation 03 and is designed to swing between the center 01 of the tire vulcanizer 1 and the first position P1 of the sliding device 3 described below. Back to FIG. 5, the tire T, after being raised as high as the position ②, can be swung to the position ③, and further down to the position ④.

The sliding device 3 functions to bring a lower rim 31 from the first position P1 at the intermediate position on the vulcanizer 1 side to the second position P2 below an upper rim 32 mounted on the postcure tire inflator 4. In the position ④ the tire T is mounted on the lower rim 31. The carrier 19 can move between the first and second positions P1 and P2 with the lower rim 31 in the loaded state, sliding the tire T from the position ④ to the position ⑤.

Figure 4:
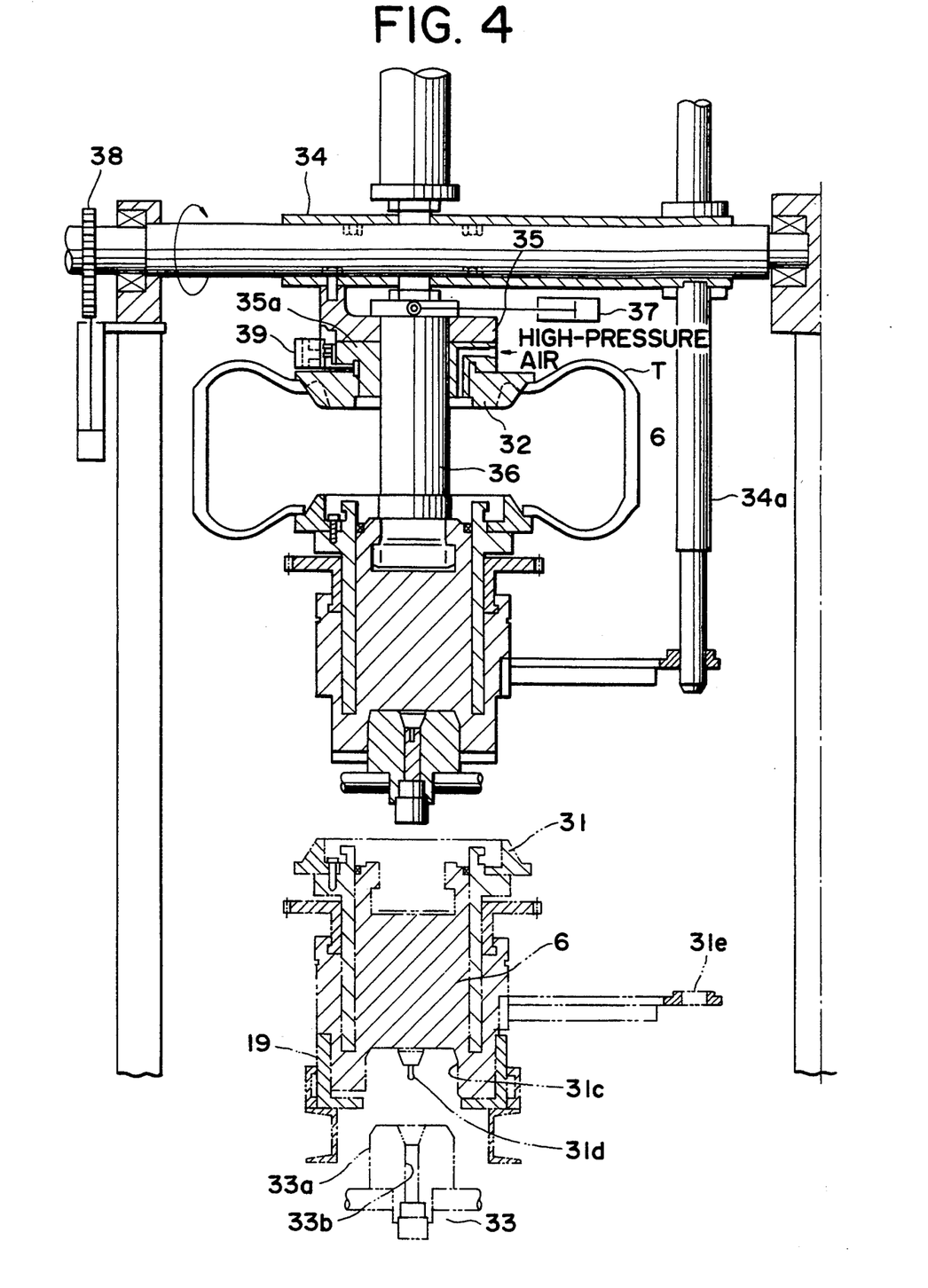
FIG. 4 is a sectional view taken along line X—X of FIG. 1 showing a major portion of the postcure tire inflator.

The postcure tire inflator 4 is designed to mount two sets of separable upper first and lower second rims 31 and 32 which can be turned over in relation to the center 02, and has a lifting device 33 for separating the lower rim 31 located in the second position P2 from the upper rim. The general constitution of this postcure tire inflator 4 is approximately as described below. A pedestal 35 is installed to a rotating frame 34. Under the pedestal 35 is installed a movable section 35a which can be moved up and down in relation to the pedestal 35 by means of a cylinder device not illustrated. On this pedestal 35 is supported a rocking shaft 36 which can be rotated through a specific angle by means of a cylinder device 37. The forward end of this rocking shaft 36 has a male mold locking concave and convex section 36a, which passes through a female mold locking concave and convex section 31a of the lower rim 31 and turned in a space 31b through a specific angle to assemble the upper and lower rims 31 and 32 into one body. The lower rim 31 which has been released from the rocking shaft 36, is moved by the lifting device 33 toward, and away from, the carrier 19 of the sliding device 3. The tire T in the position ⑤ comes to the position ⑥ where the tire T is filled with a high-pressure air for inflation and cooling as shown in FIG. 4, and further comes to the position ⑦ where the tire T has been turned over as shown in FIG. 5.

Figure 2:
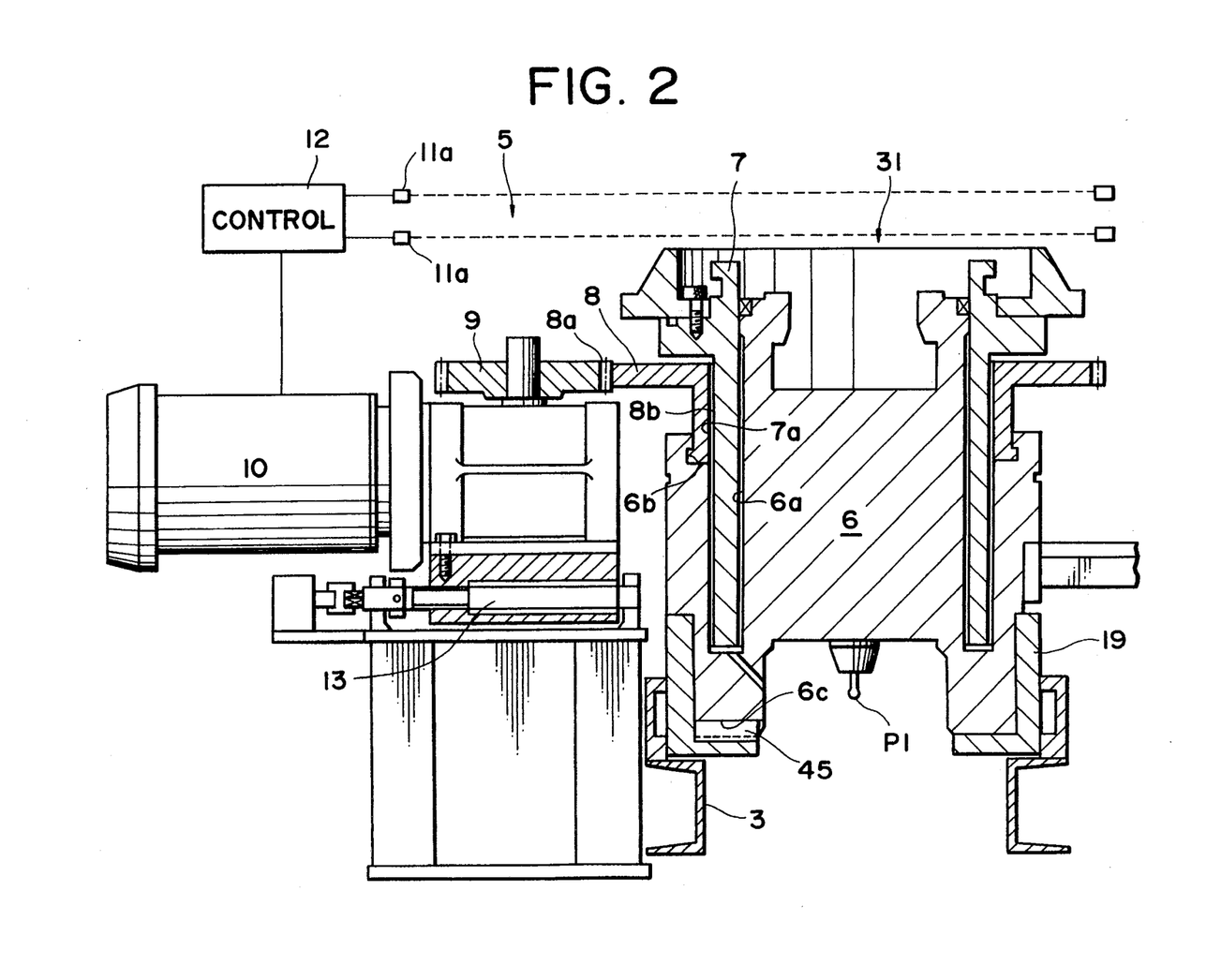
FIG. 2 is a sectional view showing a major portion of the rim clearance adjusting device of the postcure tire inflator of the present invention taken along line Y—Y in FIG. 1.

The rim clearance adjusting device of the postcure tire inflator of the present invention is mounted in the first position P1 of the sliding device 3. In this position, the lower rim 31 is moved for clearance adjustment. Subsequently, the rim clearance adjusting device of the postcure tire inflator of the present invention will be explained with reference to FIGS. 1 and 2. FIG. 1 is a top view showing the sliding device 3. FIG. 2 is a sectional view taken along line Y—Y of FIG. 1, showing the section of the rim clearance adjusting device of the postcure tire inflator of the present invention.

In FIG. 1, the rim clearance adjusting device consists of the lower rim 31, the driving device 5, and the sliding device 3. The driving device 5 is located in a position where it can move into, and out of, engagement with the lower rim 31 when the lower rim 31 has moved to the first position P1 by the sliding device 3. FIG. 2 shows the lower rim 31 which has moved to the first position P1. The lower rim 31 consists of a body 6 as a support member, a lifting member 7 as a rotating screw member, and a nut member 8. The driving device 5 consists of a gear 9, a motor 10, and a crosswise moving means 13, In FIG. 2, the body 6 is mounted and locked in the carrier 19 with a key 45 inserted in a keyway 6c. The body 6 is provided with a cylindrical groove 6a, in which the lifting member 7 is vertically movably fitted. This lifting member 7 has external threads 7a. The nut member 8 is rotatably supported in a circumferential groove 6b of the body 6, and is provided with internal threads 8b into which the lifting member 7 having the external threads 7a is screwed. The nut member 8 is further provided with a gear 8a on the outer circumference. As the nut member 8 is turned, the lifting member 7 moves up and down via the screw threads 7a and 8b. The mechanism described above is the upper and lower rim clearance adjusting mechanism of the lower rim 31, in which the lifting member 7 and the nut member 8 operate as rotating screw members for adjustment of lower rim height. A geared motor 10 having a gear 9 is mounted so that when the lower rim 31 is in the first position P1, the gear 8a will mesh the gear 9. This geared motor 10 is designed to move upwards and downwards by the tooth height of the gear 9 into mesh with, and away from, the gear 8a, using the crosswise moving means 13 such as a ball screw. A plurality of photo sensors 11a and 11b are installed at places corresponding to the specific height of the lower rim 31, which are connected to the geared motor 10 through a control system 12. For example when the photo sensor 11a is selected, the lower rim 31 interrupts the axis of light at a specific height, stopping the geared motor 10.

Figure 3:
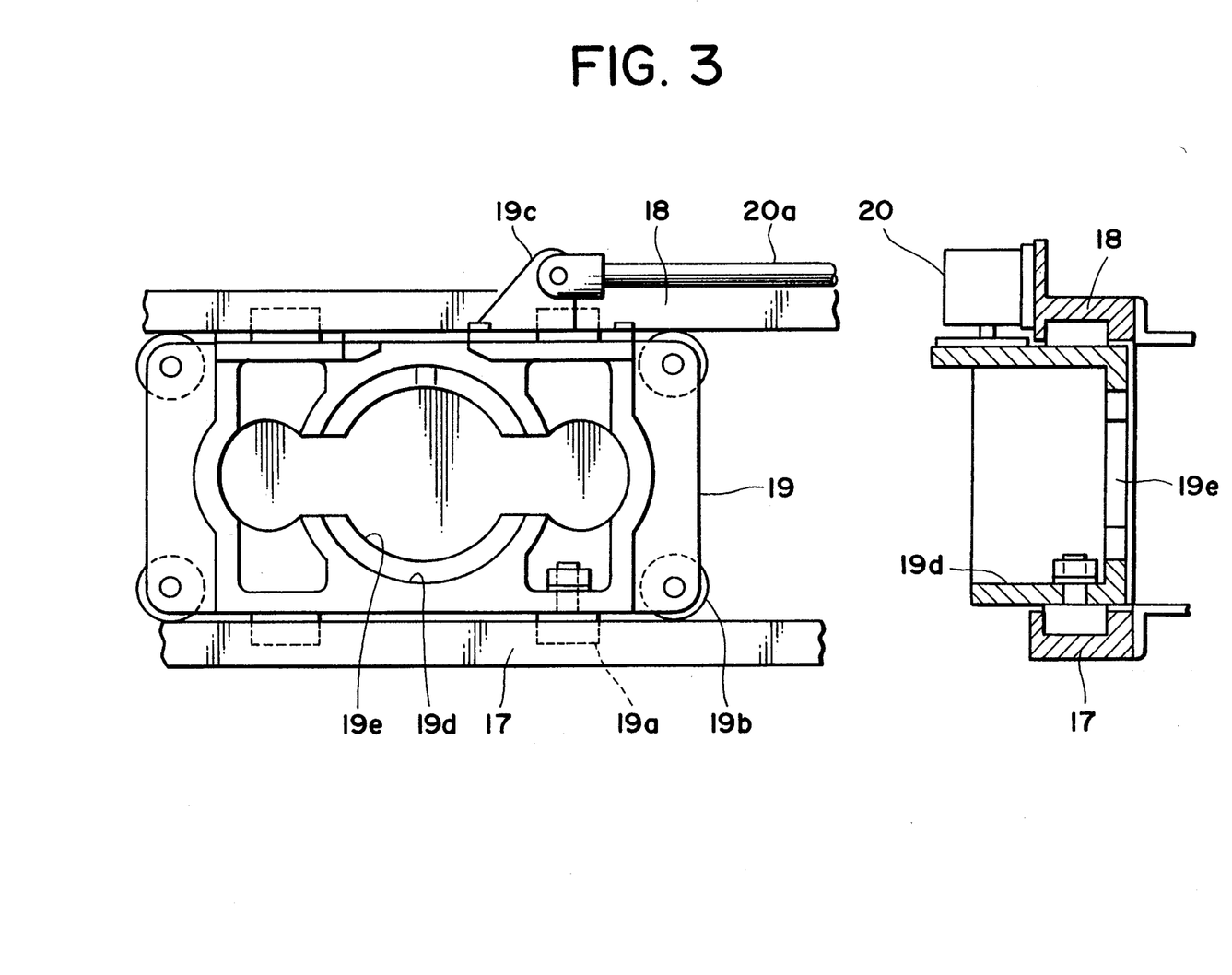
FIG. 3 is a detail view of a sliding device.

Next, a detailed constitution of the sliding device 3 will be explained. In FIG. 1, the sliding device 3 is composed of groove-type rails 17 and 18 oppositely arranged within a horizontal plane, the carrier 19 which can travel along the rails 17 and 18, and a cylinder device 20 connected to the carrier 19. In FIG. 3, the carrier 19 is positioned by means of a roller follower 19a running in the grooves of the rails 17 and 18, and a roller follower 19b running in contact with the side surfaces of the rails 17 and 18. A rod 20a of the cylinder device 20 is connected to the carrier 19 through a bracket 19c, so that the carrier 19 can reciprocate with the expansion and contraction of the rod 20a. The carrier 19 is provided with a circumferential wall 19d in which the lower rim will be fitted, and a triple hole 19e in which the lifting device of the postcure tire inflator described later passes through.

Furthermore, a major portion of the postcure tire inflator in which the above-described lower rim 31 and the body 6 are inserted will be explained by referring to FIG. 4. As shown at the body 6 inserted in the carrier 19, the body 6 has a hole 31c in which a lock pin 31d is vertically installed. On the other hand, the forward end of the lifting device 33 has a cylindrical portion 33a having a built-in collet chuck 33b which can be opened and closed. On the side surface of the body 6 is installed a positioning ring 31e. Inserting this ring 31e into the guide 34a which is vertically installed on the rotating frame 34 can prevent the fall of the lower rim 31 and the body 6. Also, with the cylindrical portion 33a of the lifting device 33 inserted in the hole 31c of the lower rim 31, the lock pin 31d is locked to be pulled downwards by the collet chuck 33b; that is, the lifting device 33 can pull downwards the lower rim 31 and the tire T, overcoming the force of attachment of the tire T and the upper rim 32. A numeral 38 refers to a rack-and-pinion device for turning the rotating frame 34 through 180 degrees, and a numeral 39 denotes a locking device for releasably locking the upper rim 32 to the pedestal 35.

Next, the operation of the rim clearance adjusting device of the postcure tire inflator of the present invention described above will be explained. In FIG. 1, when it is necessary to adjust the clearance between the upper and lower rims with a change in tire sizes, the lower rim 31 is moved from the second position P2 below the upper rim 32 which is mounted on the postcure tire inflator 4, to the first position P1 at the intermediate position on the vulcanizer 1 side. In FIG. 2, when the crosswise moving means 13 is driven to lock the gear 9 from a retreat position to the operating position, the gear 9 comes into mesh with the gear 8a; accordingly when the geared motor 10 is driven, the gear 9 rotates to turn the nut member 8, thus moving the lifting member 7 upwards or downwards. At this time, the photo sensor 11 detects the height of the lower rim 31, to automatically stop the geared motor 10 at a desired level. Then, the crosswise moving means 13 is driven again to retreat the gear 9, thus ending the adjustment of height of the lower rim 31, that is, the adjustment of a clearance between the upper and lower rims 31 and 32. The adjustment of a plurality of lower rim clearances can be performed fully automatically in order by the method described above.

Figure 6:
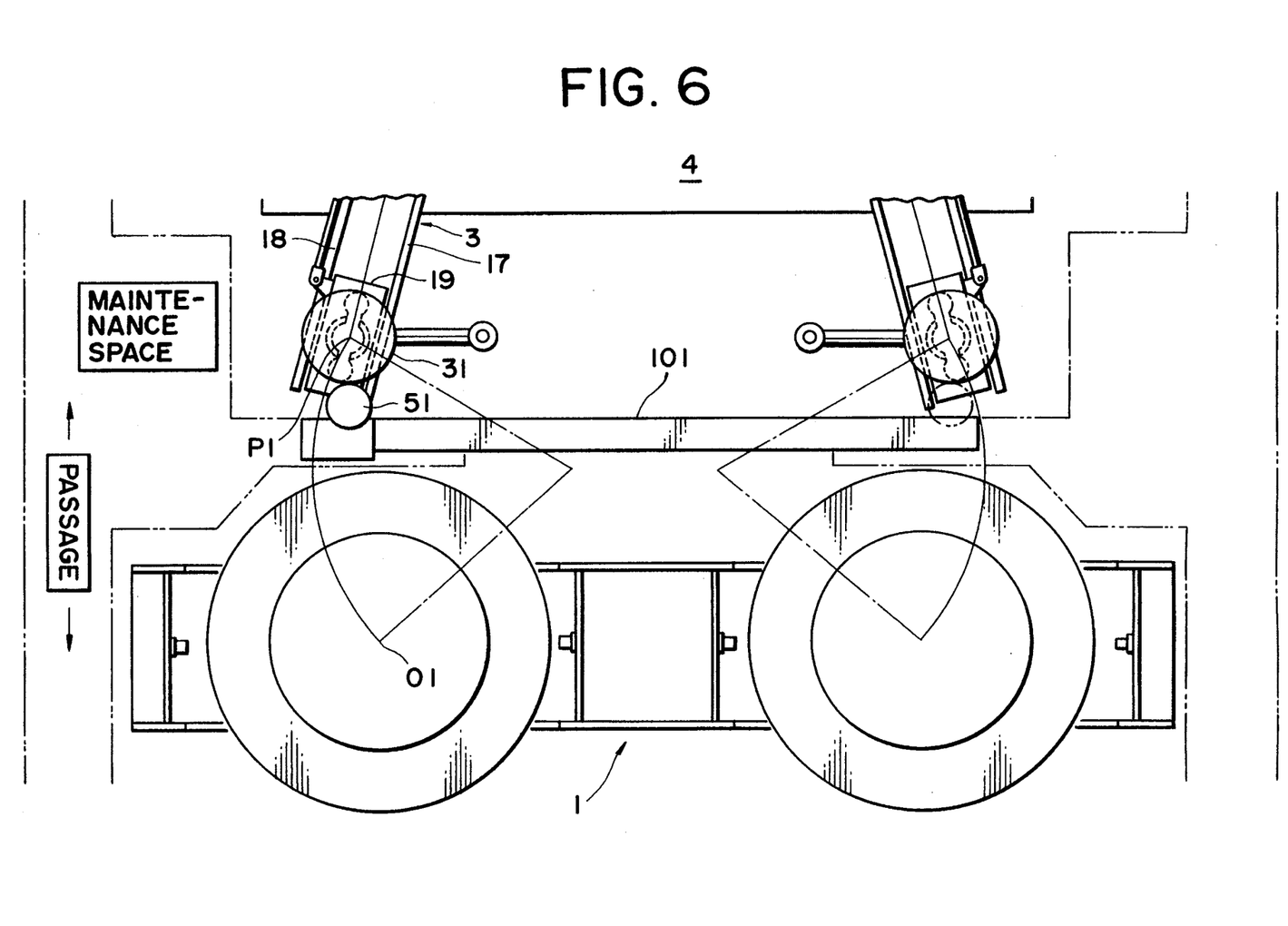
FIG. 6 is another rim clearance adjusting device of the postcure tire inflator of the present invention.

In a passenger car tire vulcanizer, there are generally installed two right and left cavities in symmetrical positions as shown in FIG. 6. In the two cavities, two first positions P1 are connected by a connecting member, so that a single driving device 5 will be movable for use in both positions, thereby enabling simplification of the equipment. Since the lower rim height is not adjusted so often, it is possible to use the driving device 5 for both cavities. Next, another embodiment will be explained with reference to FIGS. 6, 7, 8 and 9.

Figure 7:
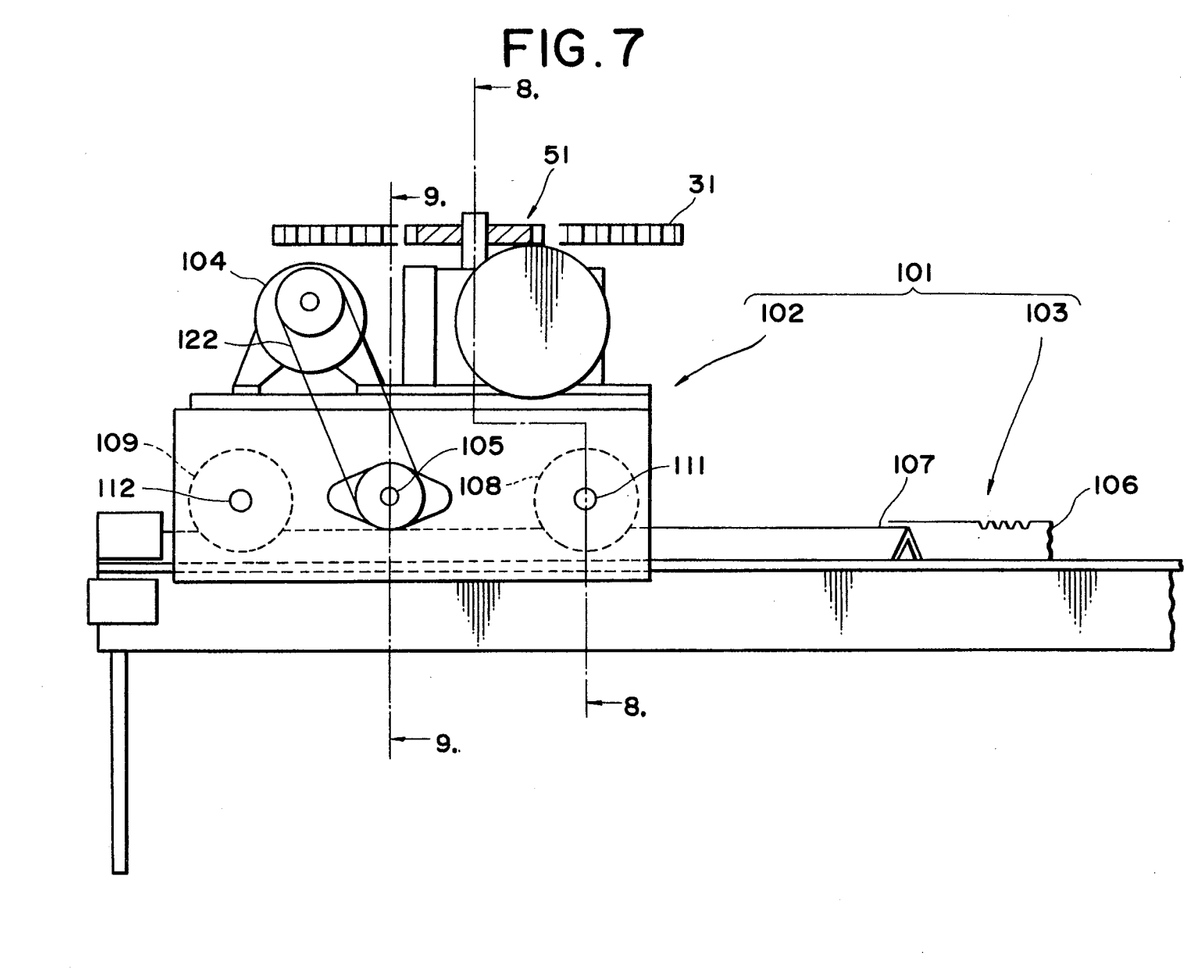
FIG. 7 is a side view of a moving means of FIG. 6.
Figure 8:
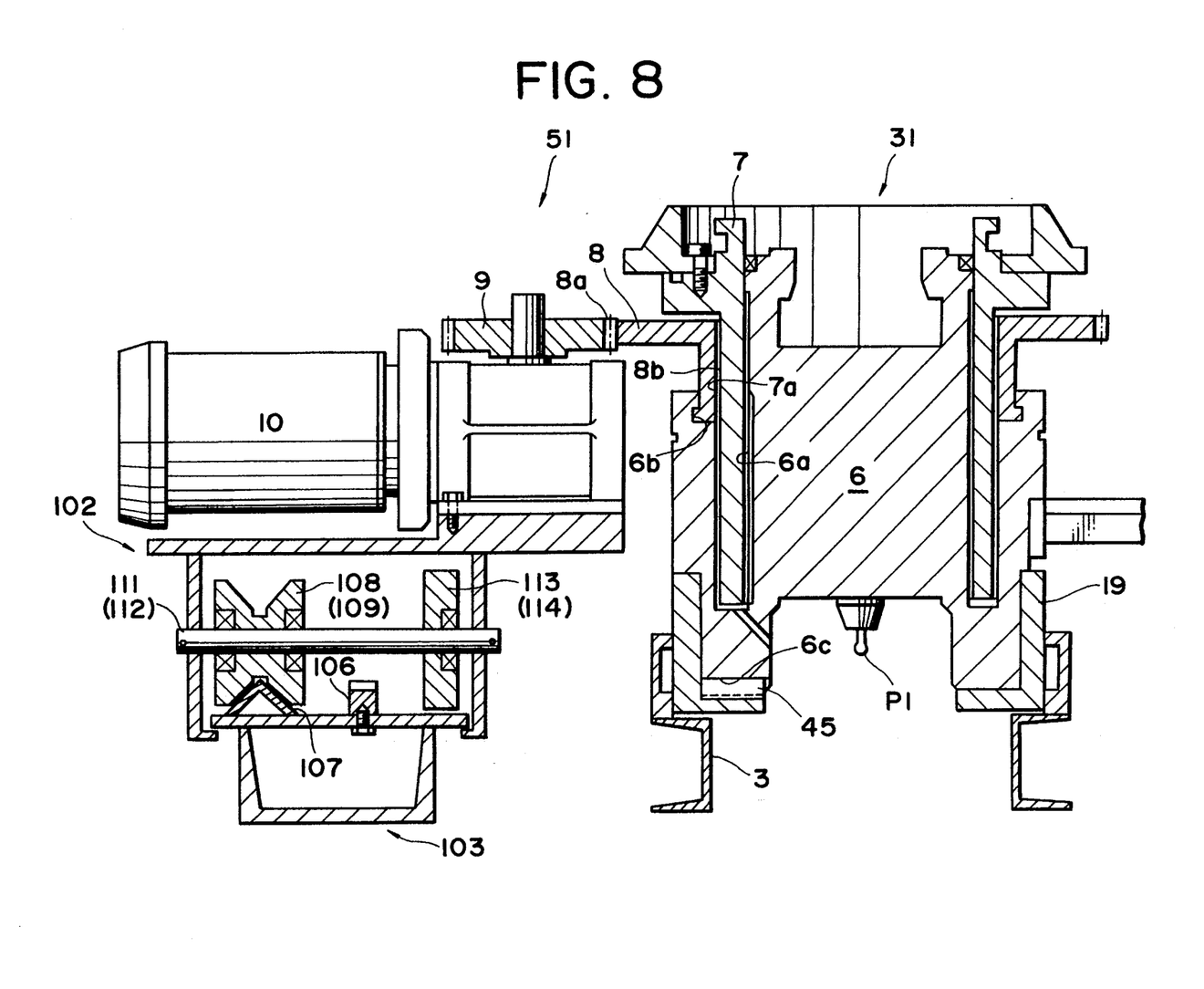
FIG. 8 is sectional view taken along line A—A of FIG. 7.
Figure 9:
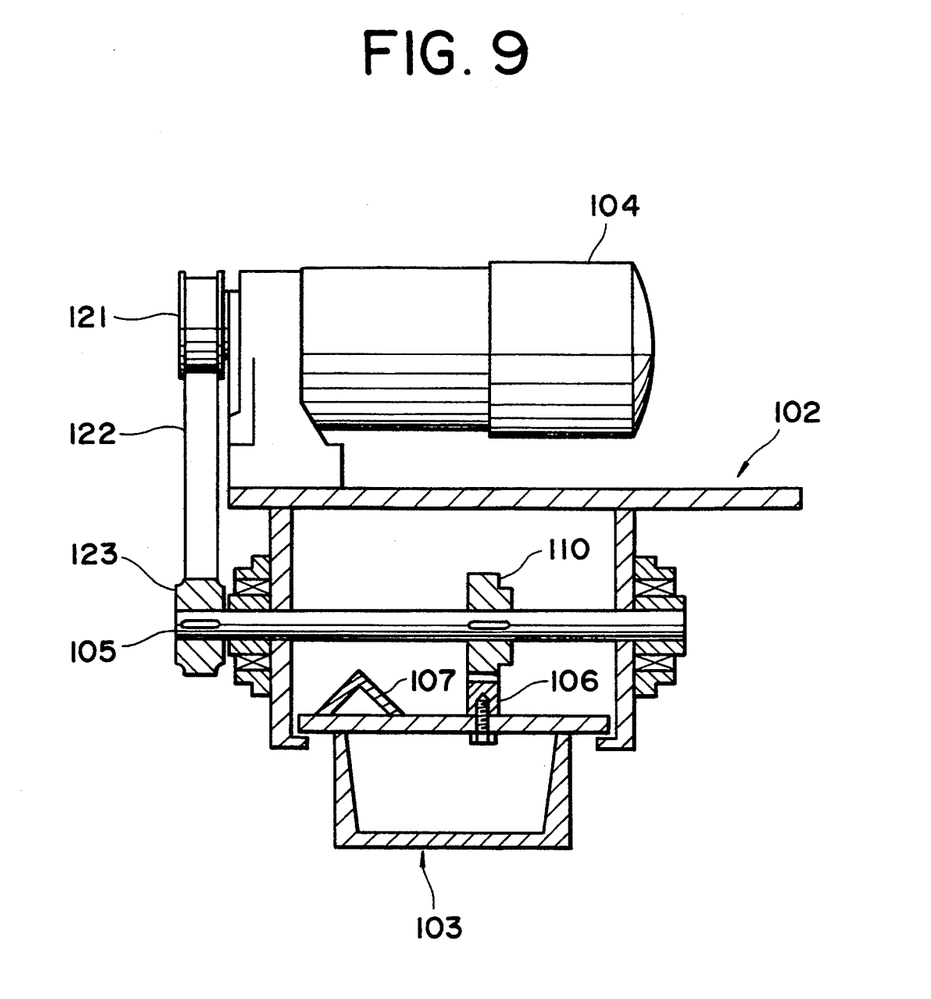
FIG. 9 is a sectional view taken along line B—B of FIG. 7.

FIG. 6 is a top view showing the location of a driving device 51 and a moving means 101 in another rim clearance adjusting device; FIG. 7 is a side view showing the moving means 101; FIG. 8 is a sectional view taken along line A—A of FIG. 7; and FIG. 9 is a sectional view taken along line B—B of FIG. 7.

In FIG. 6, the driving device 51 can be moved by the moving means 101 from the first position P1 of the left cavity indicated by a full line to the first position P1 of the right cavity indicated by an alternate long and two short dashes line. The driving device 51 has the same function as the driving device 5 shown in FIG. 1, but differs in the mounting position.

In FIG. 7, the moving means 101 comprises a moving box 102 which travels along a rail 103 as a connecting member, and a moving motor 104 mounted together with the driving device 51 on the moving box 102. The driving device 51 functions to move the lower rim 31 upwards and downwards by turning the rotating screw member. The moving motor 104 functions to move the driving device 51 along the rail 103 by moving the moving box 102 by turning the driving shaft 105 through a belt 22. On the rail 103 are mounted a rack 106 and a triangular rail 107. On the triangular rail 107, rollers 108 and 109 rotatably installed on the shafts 111 and 112 inside of the moving box 102 run, thus moving the moving box on the rail 103.

In FIG. 8, the rollers 108 and 109 have a V-groove at the center. In this V-groove the triangular rail 107 fits, so that the moving box 102 runs along the triangular rail 107. On the shafts 11 and 112 are installed wheels 113 and 114, which, together with the rollers 108 and 109, support the moving box 102.

In FIG. 9, the shaft 105 is rotatably supported within the moving box 102; the rack 106 is installed by screw threads on the rail 103. On the shaft 105 is installed a pulley 123, which is connected to a driving shaft 121 of the moving motor 104 through a belt 122. On the shaft 105 is fitted a pinion 110. When the moving motor 104 is driven, the pinion 110 turns to travel on the rack 106. Therefore, the moving box 102 slides on the rail 103.

Next, the operation of the rim clearance adjusting device of the postcure tire inflator in which the driving device 51 of another embodiment described above will be explained. When the moving motor 104 is driven to turn the shaft 105, the pinion 110 rotates to travel on the rack 106. At this time, the moving box 102 is guided by the rollers 108 and 109 on the triangular rail 107, and is supported by the rollers 108 and 109 and the wheels 113 and 114. In FIG. 6, with a change in tire sizes, the driving device 51 is moved to the cavity side where there has occurred a necessity to adjust the clearance between the upper and lower rims, moving the driving device 5 into engagement with the nut member 8 of the lower rim 31 to be adjusted. The upper-lower rim clearance can be adjusted by moving this nut member upwards and downwards.

Figure 10:
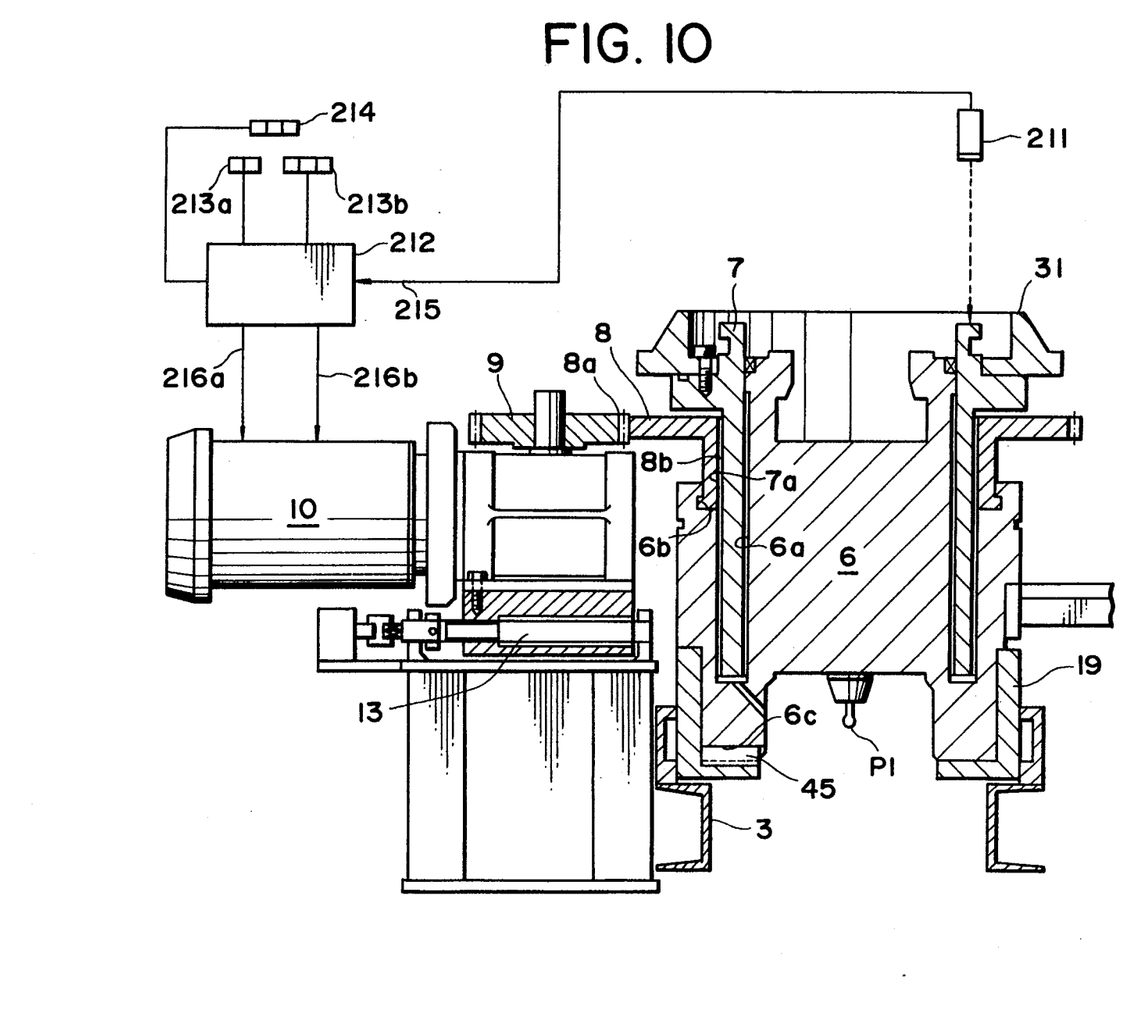
FIG. 10 is a sectional view showing a major portion of another rim clearance adjusting device of the postcure tire inflator of the present invention.
Figure 11:
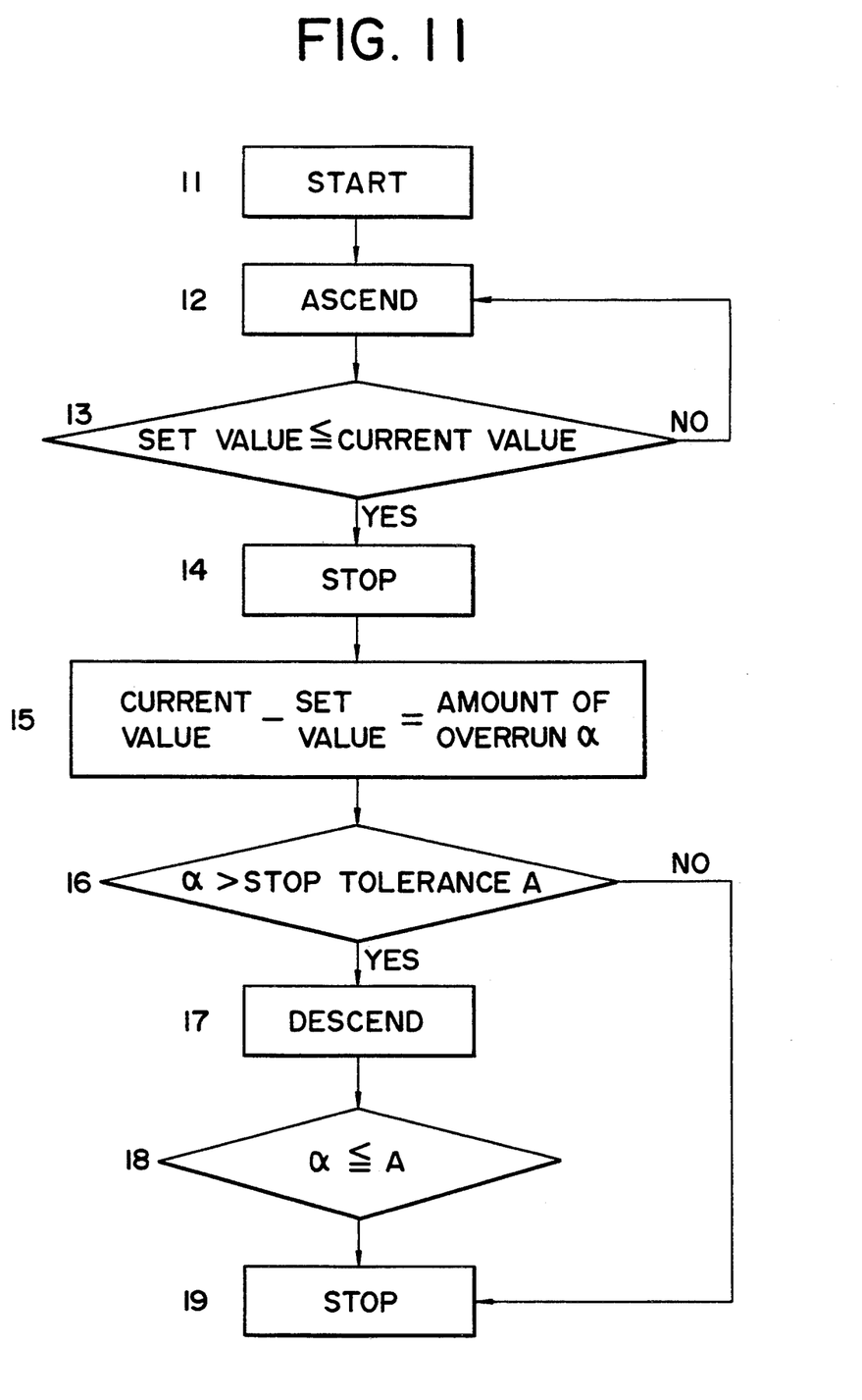
FIG. 11 is flowchart of a control circuit of the rim clearance adjusting device shown in FIG. 10.

FIG. 10 shows another embodiment for adjusting the height of the lower rim above the support member thereof in the rim clearance adjusting device in FIG. 2, which will be explained with reference to FIGS. 10 and 11. FIG. 10 is a sectional view showing a major portion of the rim clearance adjusting device, and FIG. 11 is a flowchart of a control circuit of the rim clearance adjusting device shown in FIG. 10.

First, the constitution of this another embodiment will be explained. In FIG. 10, a difference from FIG. 2 lies in the respect that a distance sensor 211 and a control circuit 212 are provided in place of the photo sensors 11a and 11b and the control system 12. The distance sensor 211 is fixedly mounted on a standing post or other not illustrated, about 300 mm vertically above the lifting member 7 fitted with the lower rim 31. A distance thus sensed by the sensor 211 from the distance sensor 211 to the upper surface of the lifting member 7 is changed to an electric quantity, which is fed out as a height signal 215 into the control circuit 211. The control circuit 212 is connected to the geared motor 10, compares the height signal 215 with a preset value, outputting a normal-turn driving signal 216a or a reverse-turn driving signal 216b to the geared motor 10 to make on-off control of the motor 10.

The distance sensor 211 employed is an ultrasonic distance sensor or other distance sensor. The distance sensor 211 is capable of sensing with a resolution of 1 mm if within the measurement range of about 250 mm. Therefore the range of height adjustment of the lower rim 31 can be steplessly sensed. A distance in the vertical direction from the distance sensor 211 to the upper surface of the lifting member 7 corresponds to the height of the lower rim 31, and therefore it is possible to know the height of the lower rim 31 by measuring this distance. The distance measuring point stated above is selected on the upper surface of the lifting member 7, not on the upper surface of the lower rim 31, because the upper surface of the ring-like lower rim 31 moves in the horizontal direction with the change of the rim size, but the upper surface of the lifting member 7 will not move.

The control circuit 212 is a programmable controller having for example memory, operation, and comparison functions, and has setting devices 213a and 213b and an indicator 214. The setting device 213a is a digital switch for setting and inputting a rim size, and the setting device 213b is a digital switch for setting and inputting the height of the lower rim 31 (a distance up to the upper surface of the lifting member 7) corresponding to the rim size. Inputting these set values can store, as a set value, the height of the lower rim 31 corresponding to the rim size. The height signal 215 fed out from the distance sensor 211 is changed to the height of the lower rim 31 by the control circuit 212, being indicated by the indicator 214.

Subsequently, operation of this another embodiment will be explained. First, the adjustment of the height of the lower rim 31 higher than the current position will be explained. In FIGS. 10 and 11, when an operator chooses and inputs rim size the to the setting device 213a, the height of the lower rim 31 corresponding thereto will be selected as a set value of the control circuit 212. With the starting of the control circuit 212 (#11), a normal-turn driving signal 216a is outputted from the control circuit 212, driving the geared motor 10, which in turn rotates the nut member 8 through the gears 9 and 8a. With the rotation of the nut member 8, the lifting member 7 and the lower rim 31 mounted thereto rise (#12) through the screws 7a and 8b, and the distance sensor 211 senses its height, feeding a sensed value back to the control circuit 212. The control circuit 212 compares the fed-back height of the lower rim 31 with the set value (#13), and drives the geared motor 10 until the current value of the lower rim height becomes equal to the set value, at which the geared motor 10 will be stopped (#12 to #14), thus completing the height adjustment. If the stop position overruns out of a tolerance because of an inertial change resulting from a change in the weight of the lower rim 31 accompanying a change in the rim size, the following compensating operation will be effected. That is, the control circuit 212 functions to compare the amount of overrun with the stop tolerance (#15 and #16); if the amount of overrun does not come within the stop tolerance, a reverse-turn drive signal 216b will be outputted to drive the geared motor 10, which in turn will lower the lower rim 31 (#17). When the amount of overrun comes within the stop tolerance, the geared motor 10 will be stopped (#18 and #19). Stopping accuracy can be improved by this compensating operation. The operator can indicate a result of this adjustment by the indicator 214 to make certain of it. Subsequently, when the height of the lower rim 31 is to be adjusted lower than the current level, the control circuit 212 outputs a reverse-turn driving signal 216b relative to a main operation and also outputs a normal-turn driving signal 216a relative to the compensating operation, that is, by reversing the above-described operation procedure. This operation, therefore, will not be explained.

The rim clearance adjusting device of the present invention has the following advantage that since the lower rim is moved by the sliding device to the intermediate position out of the postcure tire inflator and the screw member is turned by the driving mechanism located thereat to automatically control the height of the lower rim, the operator can be freed from such a hard work as turning the screw by use of a wrench within the postcure tire inflator, and the adjustment of a clearance between the upper and lower rims can be fully automatically performed. The driving mechanism is located outside of the postcure tire inflator, regardless of the turnover operation of the postcure tire inflator. It is, therefore, possible to easily install the driving mechanism without a substantial change of the postcure tire inflator itself. Furthermore, it is also possible to reduce an equipment cost by mounting a single movable driving mechanism on the connecting member which connects two intermediate positions in relation to two cavities. Furthermore, as the rim height sensed is fed back and compared with the set value when the rim clearance adjustment is carried out, it is possible to steplessly perform accurate rim clearance adjustment by using a means for sensing the lower rim height and a control circuit for comparing the lower rim height with a set value and driving the driving mechanism of the rotating screw member.

The present invention has been described in detail with particular reference to preferred embodiments thereof but it will be understood that variations and modifications can be effected within the spirit and scope of the invention.

What is claimed is:

1. A postcure tire inflator including a rotating frame, a first set of separable first and second rims, the first rim being mounted to the rotating frame, means for filling high pressure air in the tire, and a rim clearance adjusting device comprising:
   a first screw member mounting said second rim such that said second rim is moved vertically toward or away from said first rim upon rotation of said screw member;
   a first sliding device supporting said second rim and said first screw member for reciprocating movement between a first position out of vertical alignment with said first rim and a second position spaced from said first position, said second position being located in vertical alignment with said first rim; and
   a driving mechanism positioned to engage said screw member so as to rotate said screw member and adjust a vertical clearance of said second rim when said second rim is in said first position.

2. The postcure tire inflator of claim 1, including a second set of separable first and second rims, a second screw member and a second sliding device, further comprising a moving device for moving said driving mechanism between said first and second sliding devices at said first positions of said first and second screw members such that said driving mechanism can selectively drive each of said first and second screw members at the first positions thereof.

3. The postcure tire inflator of claim 1, further comprising:
   height sensing means for sensing a vertical height of said second rim; and
   control means for storing a set vertical height value, for comparing said set height value with a sensed height, and for controlling said driving mechanism based on said comparison.

4. The postcure tire inflator of claim 1 wherein said first screw member comprises:
   a lifting member supporting said second rim;
   a body having a nut member rotatably supported by said body; and
   mating screw threads on said lifting member and said nut member such that rotating of said nut member causes vertical movement of said lifting member.

5. The postcure tire inflator of claim 4 wherein said driving mechanism comprises a gear movably mounted for selective engagement with said nut member.

6. The postcure tire inflator of claim 1 wherein said first sliding device comprises:
   rails extending between said first position and said second position; and
   a carrier movable on said rails and supporting said second rim, said carrier having an opening through which a lifting device can pass for lifting said second rim off of said carrier when said second rim is at said second position.

7. The postcure tire inflator of claim 6 wherein said carrier includes roller followers cooperating with said rails.

8. The postcure tire inflator of claim 1 including photo sensors positioned for sensing vertical heights of said second rim.

9. The postcure tire inflator of claim 2 wherein said moving device for moving said driving mechanism comprises:
   a rail;
   a moving box on which said driving mechanism is mounted, said moving box being mounted on said rail; and
   a rack and pinion mounted between said moving box and said rail for moving said moving box along said rail.

* * * * *